United States Patent
Ito et al.

(10) Patent No.: US 11,112,643 B2
(45) Date of Patent: Sep. 7, 2021

(54) METHOD FOR MANUFACTURING ELECTRO-OPTICAL DEVICE, ELECTRO-OPTICAL DEVICE, AND ELECTRONIC APPARATUS

(71) Applicant: SEIKO EPSON CORPORATION, Tokyo (JP)

(72) Inventors: Satoshi Ito, Eniwa (JP); Shotaro Izawa, Chitose (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/999,080

(22) Filed: Aug. 21, 2020

(65) Prior Publication Data
US 2021/0063812 A1 Mar. 4, 2021

(30) Foreign Application Priority Data
Aug. 27, 2019 (JP) ............................. JP2019-154430

(51) Int. Cl.
G02F 1/1335 (2006.01)
G02F 1/1343 (2006.01)

(52) U.S. Cl.
CPC .. *G02F 1/133526* (2013.01); *G02F 1/134309* (2013.01); *G02F 2201/121* (2013.01); *G02F 2201/123* (2013.01)

(58) Field of Classification Search
CPC ......... G02F 1/133526; G02F 1/133351; H01L 27/1259; B32B 2457/20; B05D 1/00; C23C 14/00; G03F 7/00
See application file for complete search history.

(56) References Cited

U.S. PATENT DOCUMENTS

| 2003/0053016 | A1* | 3/2003 | Kubota | G02F 1/133553 349/113 |
| 2014/0036373 | A1* | 2/2014 | Sunagawa | G02F 1/133526 359/620 |
| 2015/0041833 | A1* | 2/2015 | Nimura | H01L 29/78633 257/88 |
| 2015/0268776 | A1* | 9/2015 | Ishizaki | G06F 1/16 345/174 |

(Continued)

FOREIGN PATENT DOCUMENTS

| JP | 2005215624 | 8/2005 |
| JP | 2006078782 | 3/2006 |
| JP | 2019040153 | 3/2019 |

*Primary Examiner* — Mariam Qureshi
(74) *Attorney, Agent, or Firm* — JCIPRNET (57) ABSTRACT

An electro-optical device including a first substrate in which a plurality of pixel electrodes are provided, a second substrate in which a common electrode is provided, and an electro-optical layer disposed between the plurality of pixel electrodes and the common electrode, and having optical characteristics varying in accordance with an electric field, wherein the first substrate or the second substrate includes a base member having light-transmissivity and provided with a plurality of concave faces corresponding to the plurality of pixel electrodes, and a lens layer disposed to fill inner sides of the plurality of concave faces and having a refractive index different from that of the base member, and the base member includes a plurality of layers of which etching rates under a same etching condition differ from one another.

9 Claims, 9 Drawing Sheets

(56) References Cited

U.S. PATENT DOCUMENTS

2015/0355502 A1* 12/2015 Ozawa ................ G02B 3/0012
349/57
2016/0097883 A1* 4/2016 Wakabayashi ....... G02B 3/0068
349/57
2019/0064584 A1 2/2019 Ito

* cited by examiner

METHOD FOR MANUFACTURING ELECTRO-OPTICAL DEVICE, ELECTRO-OPTICAL DEVICE, AND ELECTRONIC APPARATUS

The present application is based on, and claims priority from JP Application Serial Number 2019-154430, filed Aug. 27, 2019, the disclosure of which is hereby incorporated by reference herein in its entirety.

BACKGROUND

1. Technical Field

The present disclosure relates to a method for manufacturing an electro-optical device, the electro-optical device, and an electronic apparatus.

2. Related Art

For an electronic apparatus such as a projector, an electro-optical device such as a liquid crystal device configured to vary optical characteristics for each of pixels is typically used. For example, the apparatus described in JP 2019-40153 A includes an element substrate on which a plurality of pixel electrodes and a plurality of switching elements are provided, a counter substrate on which a common electrode is provided, and a liquid crystal layer disposed between these substrates.

The element substrate in JP 2019-40153 A is provided with a lens at a position overlapping in a plan view with the pixel electrode. The lens is formed by filling an inside of a concave face formed at the substrate or an interlayer insulating film with a light-transmitting lens layer. The substrate or the interlayer insulating film is composed of an $SiO_2$, and the concave face is formed by wet etching.

The apparatus described in JP 2019-40153 A has an issue in that it is difficult to adjust a shape of lens face due to a constant etching rate with respect to the substrate or the interlayer insulating film for forming the lens throughout an entire region in a thickness direction.

SUMMARY

An aspect of an electro-optical device of the present disclosure includes a first substrate in which a plurality of pixel electrodes are provided, a second substrate in which a common electrode is provided, and an electro-optical layer disposed between the plurality of pixel electrodes and the common electrode, and having optical characteristics varying in accordance with an electric field, wherein the first substrate or the second substrate includes a base member having light-transmissivity and provided with a plurality of concave faces corresponding to the plurality of pixel electrodes, and a lens layer disposed to fill inner sides of the plurality of concave faces and having a refractive index different from that of the base member, and the base member includes a plurality of layers of which etching rates under a same etching condition differ from one another.

An aspect of a method for manufacturing an electro-optical device of the present disclosure, includes laminating a plurality of layers of which etching rates under a same etching condition differ from one another, thereby forming a base member having light-transmissivity, etching the base member, thereby forming a concave face, and forming a lens layer having a refractive index different from that of the base member, thereby filling an inner side of the concave face.

DESCRIPTION OF EXEMPLARY EMBODIMENTS

Preferred embodiments of the present disclosure will be described below with reference to the appended drawings. Note that, in the drawings, dimensions and scales of sections are differed from actual dimensions and scales as appropriate, and some of the sections are schematically illustrated to make these easily recognizable. Also, the scope of the present disclosure is not limited to those embodiments unless otherwise stated to limit the present disclosure in the following description.

1. Electro-Optical Device

1A. First Embodiment 1A-1. Basic Configuration of Electro-Optical Device 100

Figure 1:
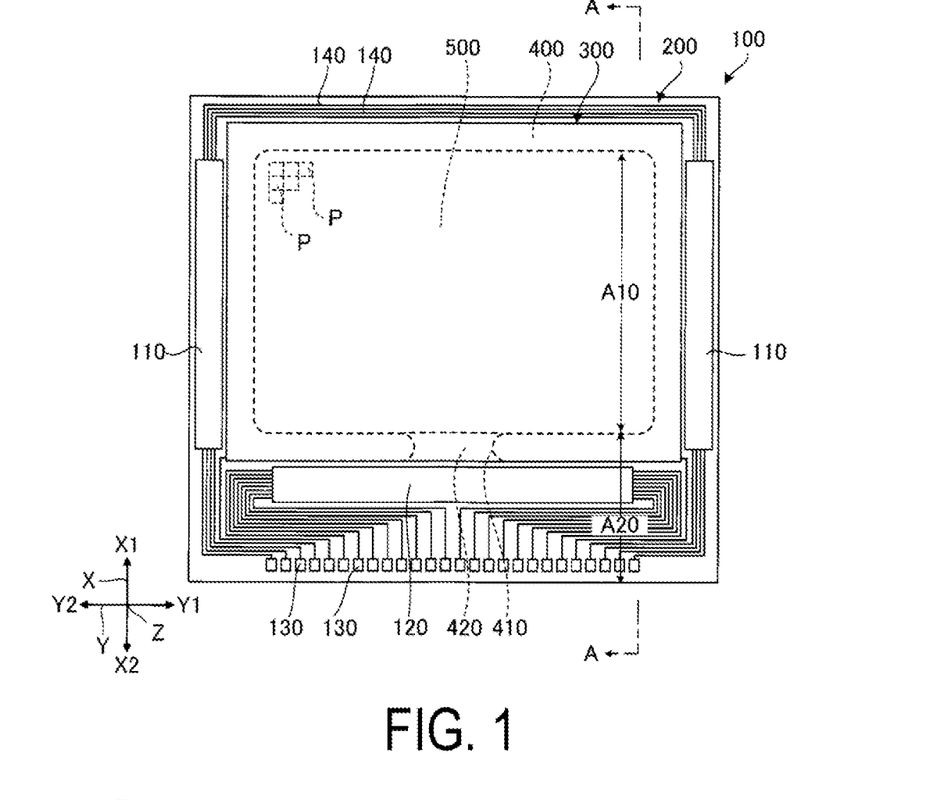
FIG. 1 is a plan view schematically illustrating an electro-optical device according to a first embodiment.
Figure 2:
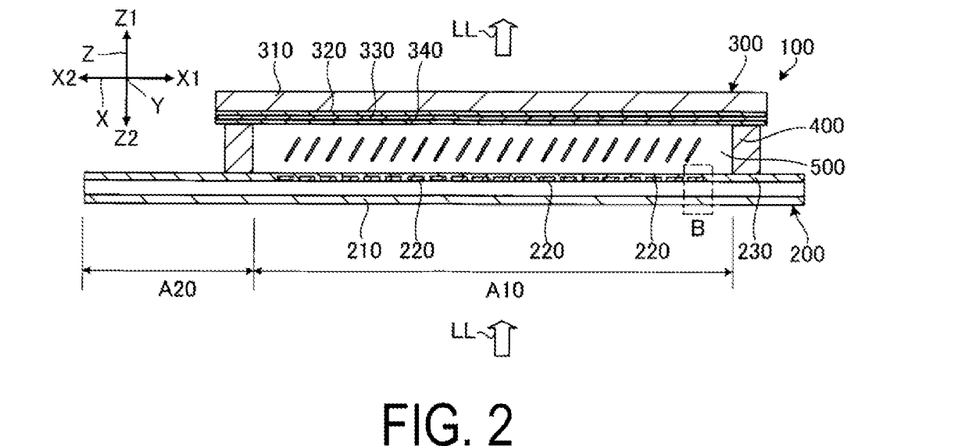
FIG. 2 is a cross-sectional view taken along line A-A in FIG. 1.

FIG. 1 is a plan view schematically illustrating an electro-optical device 100 according to the first embodiment. FIG. 2 is a cross-sectional view taken along line A-A in FIG. 1. Note that, for convenience of explanation, descriptions will be given appropriately using an X-axis, a Y-axis, and a Z-axis that are orthogonal to one another. In addition, a direction along the X-axis is referred to as "X1 direction", and a direction opposite to the X1 direction is referred to as "X2 direction". Similarly, a direction along the Y-axis is referred to as "Y1 direction", and a direction opposite to the Y1 direction is referred to as "Y2 direction". A direction along the Z-axis is referred to as "Z1 direction", and a direction opposite to the Z1 direction is referred to as "Z2 direction".

The electro-optical device 100 illustrated in FIGS. 1 and 2 is a liquid crystal display device of a transmissive type, which is of an active matrix driving scheme. As illustrated in FIG. 2, the electro-optical device 100 includes an element substrate 200 having light-transmissivity, a counter substrate 300 having light-transmissivity, a seal member 400 having a frame shape, and a liquid crystal layer 500. The element substrate 200 is an example of "first substrate", the counter substrate 300 is an example of "second substrate", and the liquid crystal layer 500 is an example of "electro-optical layer". The seal member 400 is disposed between the element substrate 200 and the counter substrate 300. The liquid crystal layer 500 is disposed within a region surrounded by the element substrate 200, the counter substrate 300, and the seal member 400. Here, the element substrate 200, the liquid crystal layer 500, and the counter substrate 300 are aligned along the Z-axis. A surface of a second base body 310, described below, included in the counter substrate 300 is parallel to an X-Y plane. In the following, viewing in the +Z axis direction or the −Z direction is referred to as "plan view".

In the electro-optical device 100 of the first embodiment, light LL is incident on the element substrate 200, and passes through the liquid crystal layer 500 to be emitted from the counter substrate 300. Note that the light LL serves as visible light. In the following description, "transmissivity" refers to a transmittance to the visible light, and represents that a transmittance of the visible light may be not less than 50%. The electro-optical device 100 illustrated in FIG. 1 also has a rectangular shape in a plan view, and a planarly viewed shape of the electro-optical device 100 may be, for example, a round shape or the like without being limited to the rectangular shape.

The element substrate 200 is the first substrate on which a plurality of pixel electrodes 220 are provided. More specifically, as illustrated in FIG. 2, the element substrate 200 includes a first base body 210, the plurality of pixel electrodes 220, and a first alignment film 230. The first base body 210 is constituted by a plate having light-transmissivity and insulating properties. The pixel electrode 220 has transmissivity and is composed of a transparent conductive material such as Indium Tin Oxide (ITO) or Indium Zinc Oxide (IZO), for example. The first alignment film 230 is located closest to a side of the liquid crystal layer 500 in the element substrate 200, and makes liquid crystal molecules of the liquid crystal layer 500 aligned. Examples of a constituent material of the first alignment film 230 include polyimide and silicon oxide, for example. Note that a detailed configuration of the element substrate 200 will be described later.

The counter substrate 300 is the second substrate on which a counter electrode 330, which is an example of a common electrode, is provided. More specifically, as illustrated in FIG. 2, the counter substrate 300 includes the second base body 310, an insulating layer 320, the counter electrode 330, and a second alignment film 340. The second base body 310, the insulating layer 320, the counter electrode 330, and the second alignment film 340 are arranged in this order. Among these components, the second alignment film 340 is located closest to the side of the liquid crystal layer 500. The second base body 310 is constituted by a plate having light-transmissivity and insulating properties. The second base body 310 is composed of a glass, a quartz, or the like, for example. The counter electrode 330 is composed of a transparent conductive material such as ITO or IZO, for example. In addition, the second alignment film 340 makes the liquid crystal molecules of the liquid crystal layer 5 aligned. Examples of a constituent material of the second alignment film 340 include polyimide and silicon oxide, for example.

The seal member 400 is a member having a frame shape formed using an adhesive or the like containing various types of curable resins such as epoxy resin, for example. The seal member 400 is firmly fixed to each of the element substrate 200 and the counter substrate 300. At a part in a circumferential direction of the seal member 400, an injection port 410 for injecting a liquid crystal material containing liquid crystal molecules into an inside of the seal member 400 is formed. The injection port 410 is sealed with a seal material 420 formed using various types of resin materials.

The liquid crystal layer 500 is the electro-optical layer disposed between the plurality of pixel electrodes 220 and the counter electrode 330, and varies in optical characteristics in accordance with an electric field. More specifically, the liquid crystal layer 500 contains liquid crystal molecules having positive or negative dielectric anisotropy. The liquid crystal layer 500 is interposed between the element substrate 200 and the counter substrate 300 such that the liquid crystal molecules are in contact with both the first alignment film 230 and the second alignment film 340. The alignment of the liquid crystal molecules included in the liquid crystal layer 500 varies depending on a voltage being applied to the liquid crystal layer 500. The liquid crystal layer 5 causes the light LL to be modulated depending on the voltage being applied, to enable performing grayscale display.

As illustrated in FIG. 1, on a face on a side of the counter substrate 300 of the element substrate 200, there are arranged a plurality of scanning line driving circuits 110, a signal line driving circuit 120, and a plurality of external terminals 130. The external terminal 130 is coupled with a drawn-out wiring 140 drawn out of each of the scanning line driving circuit 110 and the signal line driving circuit 120.

The electro-optical device 100 having the configuration described above includes a display region A10 for displaying an image, and a peripheral region A20 that surrounds the display region A10 in a plan view. In the display region A10, a plurality of pixels P arrayed in a matrix pattern are provided. One piece of the pixel electrode 220 is disposed for one piece of the pixel P. In the peripheral region A20, the scanning line driving circuit 110, the signal line driving circuit 120, and the like are arranged.

1A-2. Electrical Configuration of Element Substrate 200

Figure 3:
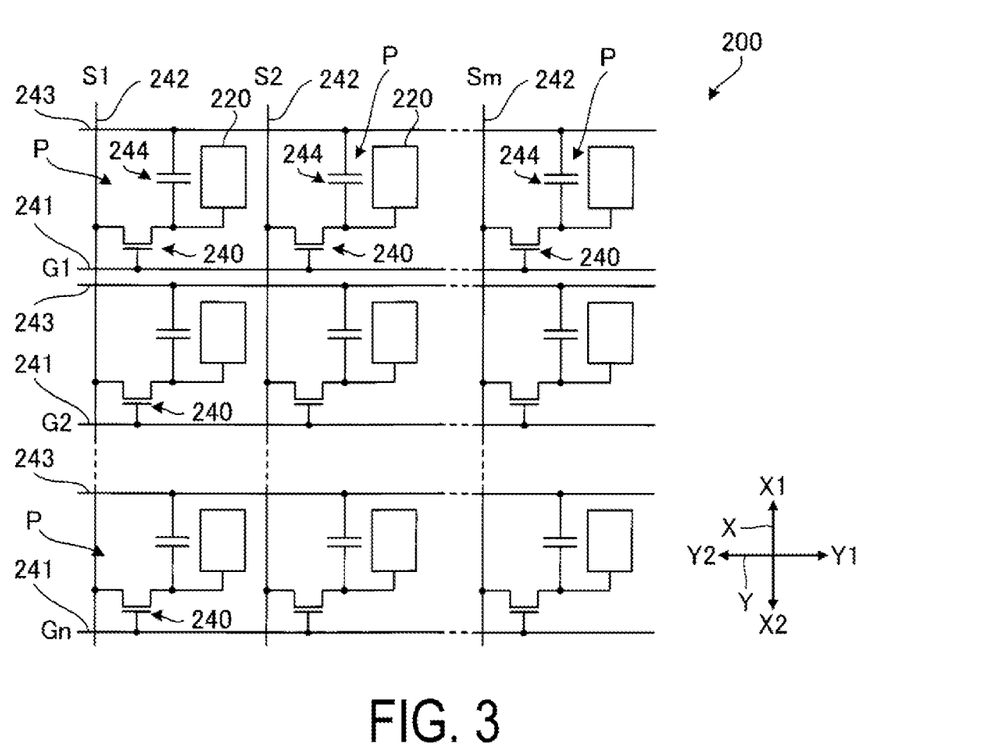
FIG. 3 is an equivalent circuit diagram illustrating an electrical configuration of an element substrate.

FIG. 3 is an equivalent circuit diagram illustrating an electrical configuration of the element substrate 200. As illustrated in FIG. 3, on the element substrate 200, there are formed n pieces of scanning lines 241, m pieces of signal lines 242, and n pieces of capacitor lines 243. Note that n and m are each an integer of 2 or greater. A TFT 240 serving as a switching element is disposed corresponding to each of the intersections between the n pieces of scanning lines 241 and the m pieces of signal lines 242.

The n pieces of scanning lines 241 each extend along the Y direction, and are aligned at equal intervals in the X direction. The scanning line 241 is electrically coupled to a gate of the TFT 240 corresponding to the scanning line 241. The n pieces of scanning lines 241 are also electrically coupled to the scanning line driving circuit 110 illustrated in FIG. 1. To the n pieces of scanning lines 241, scanning signals G1, G2, . . . , and Gn are line-sequentially supplied from the scanning line driving circuit 110.

The m pieces of signal lines 242 illustrated in FIG. 3 each extend along the X direction, and are aligned at equal intervals in the Y direction. The signal line 242 is electrically coupled to a source of the TFT 240 corresponding to the signal line 242. The m pieces of signal lines 242 are also electrically coupled to the signal line driving circuit 120 illustrated in FIG. 1. To the m pieces of signal lines 242, the image signals S1, S2, . . . , and Sm are supplied in a parallel manner from the signal line driving circuit 120 illustrated in FIG. 1.

The n pieces of scanning lines 241 and the m pieces of signal lines 242, which are illustrated in FIG. 3, are insulated from each other, and are arranged in a lattice pattern in a plan view. A region surrounded by the respective two adjacent scanning lines 241 and the respective two adjacent signal lines 242 corresponds to the pixel P. The pixel electrode 220 is electrically coupled to a drain of the TFT 240.

The n pieces of capacitor lines 243 each extend along the Y direction, and are aligned at equal intervals in the X direction. The n pieces of capacitor lines 243 are also electrically insulated with respect to a plurality of the signal lines 242 and a plurality of the scanning lines 241, and are arranged at a spacing with respect to these lines. A fixed potential such as a ground potential is applied to the capacitor lines 243. A storage capacitor 244 is also provided in parallel to a liquid crystal capacitor, between the capacitor line 243 and the pixel electrode 220, to prevent a leakage of a charge held in the liquid crystal capacitor.

When the scanning signals G1, G2, . . . , and Gn become sequentially active and the n pieces of scanning lines 241 are sequentially selected, the TFT 240 coupled to the scanning line 241 being selected is turned to ON-state. Then, the image signals S1, S2, . . . , and Sm having magnitudes commensurate with a grayscale to be displayed are received by the pixel P corresponding to the scanning line 241 being selected, to then be applied to the pixel electrodes 220. This allows a voltage having a magnitude commensurate with the grayscale to be displayed to be applied to the liquid crystal capacitor formed between the pixel electrode 220 and the counter electrode 330 of the counter substrate 300 illustrated in FIG. 2, and the alignment of the liquid crystal molecules varies depending on the voltage being applied. In addition, the voltage being applied is held by the storage capacitor 244. Such a variation in the alignment of the liquid crystal molecules causes the light LL to be modulated, to thus enable grayscale display.

1A-3. Detailed Configuration of Element Substrate 200

Figure 4:
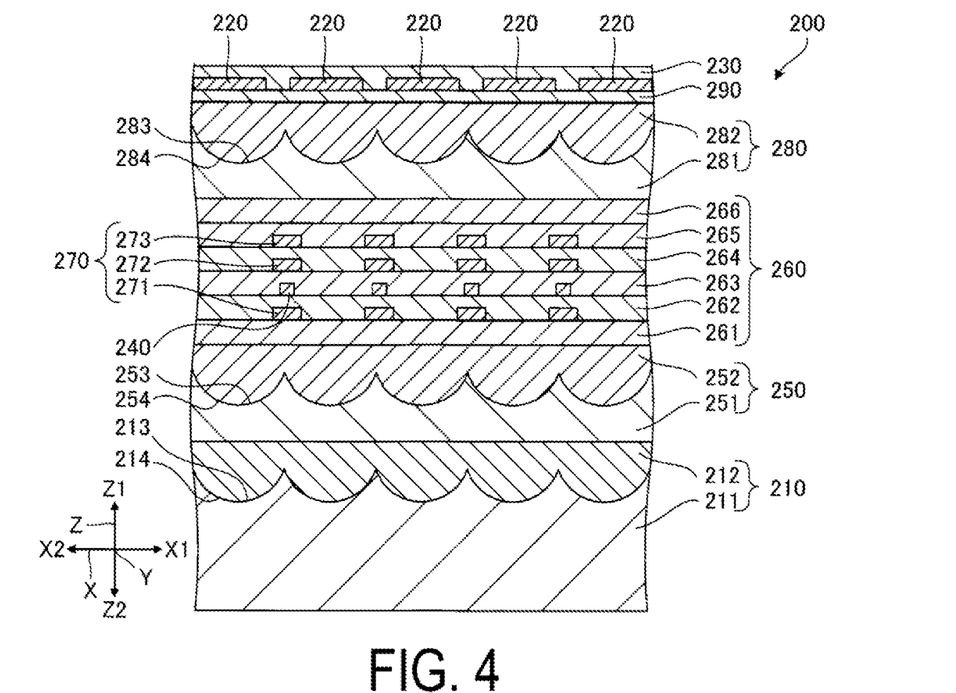
FIG. 4 is an enlarged cross-sectional view illustrating a part of an element substrate.

FIG. 4 is an enlarged cross-sectional view illustrating a part of the element substrate 200. In FIG. 4, a region B in FIG. 2 is illustrated in an enlarged manner. The region B is a part of the display region A10 in the electro-optical device 100. Note that, in FIG. 4, configurations of the respective sections are schematically illustrated for ease of understanding.

As illustrated in FIG. 4, the element substrate 200 includes, in addition to the first base body 210, the plurality of pixel electrodes 220, the first alignment film 230, and a plurality of the TFTs 240 that are aforementioned, a lens structural body 250, an insulating layered body 260, a light-shielding body 270, a lens structural body 280, and a protective film 290. These components are layered in the order of the first base body 210, the lens structural body 250, the insulating layered body 260, the lens structural body 280, the protective film 290, the plurality of pixel electrodes 220, and the first alignment film 230. Also, each of the plurality of the TFTs 240 and the light-shielding body 270 is disposed between the layers in the insulating layered body 260. The sections of the element substrate 200 will be orderly described below.

The first base body 210 is constituted by a plate having light-transmissivity and insulating properties as aforementioned. The first base body 210 of the first embodiment includes a lens array for adjusting a spread angle of the light LL for each of the pixels P. The first base body 210 illustrated in FIG. 4 has a base member 211 and a lens layer 212.

The base member 211 is a plate material having light-transmissivity and insulating properties. The base member 211 is composed of a glass, a quartz, or the like, for example. A plurality of concave faces 213 are provided on a surface on a side of the lens layer 212 of the base member 211. Although not illustrated, the plurality of concave faces 213 are arrayed, in a plan view, in a matrix pattern corresponding to the plurality of pixels P. Each of the plurality of concave faces 213 includes a curved face that functions as a lens face.

The lens layer 212 is disposed on the base member 211 to fill insides of the plurality of concave faces 213. The lens layer 212 is a layer having light-transmissivity and insulating properties composed of a material having a refractive index different from the refractive index of the base member 211. It is preferred that the refractive index of the lens layer 212 be greater than the refractive index of the base member 211. Examples of a constituent material of the lens layer 212 include silicon oxynitride and silicon nitride, for example. A plurality of convex faces 214 are provided on a surface on a side of the base member 211 of the lens layer 212. Each of the plurality of convex faces 214 has a complementary shape to the concave face 213 of the base member 211 aforementioned, and includes a curved face that functions as a lens face together with the concave face 213. Note that a protective film constituted by a silicon nitride film, a silicon oxide film, or the like may be disposed on a surface on a side opposite from the base member 211 of the lens layer 212, for example. In addition, the first base body 210 may not include a lens array, and may include a plate simply having light-transmissivity and insulating properties.

The lens structural body 250 includes a lens array for adjusting the spread angle of the light LL for each of the pixels P. The lens structural body 250 of the first embodiment is configured to adjust, in cooperation with the first base body 210 aforementioned, the spread angle of the light LL being incident on the liquid crystal layer 500 to within a desired range for each of the pixels P. The lens structural body 250 illustrated in FIG. 4 includes a light-transmissive layer 251 and a lens layer 252.

The light-transmissive layer 251 is a layered base member having light-transmissivity and insulating properties. The light-transmissive layer 251 is composed of a silicon oxide or the like, for example. A plurality of concave faces 253 are provided on a surface on a side of the lens layer 252 of the light-transmissive layer 251. Although not illustrated, the plurality of concave faces 253 are arrayed, in a plan view, in a matrix pattern corresponding to the plurality of pixels P. Each of the plurality of concave faces 253 includes a curved face that functions as a lens face.

The lens layer 252 is disposed on the light-transmissive layer 251 to fill insides of the plurality of concave faces 253. The lens layer 252 is a layer having light-transmissivity and insulating properties composed of a material having a refractive index different from the refractive index of the light-transmissive layer 251. It is preferred that the refractive index of the lens layer 252 be greater than the refractive index of the light-transmissive layer 251. Examples of a constituent material of the lens layer 252 include silicon oxynitride and silicon nitride, for example. A plurality of convex faces 254 are provided on a surface on a side of the light-transmissive layer 251 of the lens layer 252. Each of the plurality of convex faces 254 has a complementary shape to the concave face 253 of the light-transmissive layer 251 aforementioned, and includes a curved face that functions as a lens face together with the concave face 253. Note that a protective film constituted by, for example, a silicon nitride film, a silicon oxide film, or the like may be disposed on a surface on a side opposite from the light-transmissive layer 251 of the lens layer 252. In addition, it suffices that the lens structural body 250 be provided as necessary, and the lens structural body 250 may be omitted.

The insulating layered body 260 is a layered body of a layer having light-transmissivity and insulating properties. The insulating layered body 260 includes interlayer insulating films 261, 262, 263, 264, 265 and 266, and in this order, these films are layered from a side of the lens structural body 250 toward a side of the lens structural body 280. Each of the interlayer insulating films 261, 262, 263, 264, 265 and 266 is composed of a silicon oxide or the like, for example. Each of the plurality of the TFTs 240 and the light-shielding body 270 are arranged as appropriate between the layers in the insulating layered body 260.

In the example illustrated in FIG. 4, the TFT 240 is disposed between the interlayer insulating film 262 and the interlayer insulating film 263. Although not illustrated, between the layers in the insulating layered body 260, there is also disposed as appropriate each of the plurality of the scanning lines 241, the plurality of the signal lines 242, a plurality of the capacitor lines 243, and a plurality of the storage capacitors 244 that are aforementioned. There is also disposed, in a manner passing through each of the layers in the insulating layered body 260, a structural body such as a through electrode electrically coupled to the TFT 240, the scanning line 241, the signal line 242, the capacitor line 243, or the storage capacitor 244. Note that the number of the layers constituting the insulating layered body 260 is optional without being limited to the number of the layers illustrated in FIG. 4. In addition, in FIG. 4, the insulating layered body 260 is provided across a region through which the light LL passes, where the region may be constituted by a layer provided separately from the insulating layered body 260.

The light-shielding body 270 is a group of light-shielding films disposed between the layers in the insulating layered body 260. Although not illustrated, the light-shielding body 270 is disposed, in a plan view, along a region between the respective plurality of pixel electrodes 220. The light-shielding body 270 includes light-shielding films 271, 272, and 273. The light-shielding film 271 is disposed between the interlayer insulating film 261 and the interlayer insulating film 262. The light-shielding film 272 is disposed between the interlayer insulating film 263 and the interlayer insulating film 264. The light-shielding film 273 is disposed between the interlayer insulating film 264 and the interlayer insulating film 265.

Here, the TFT 240 is disposed in the Z1 direction with respect to the light-shielding film 271. This makes it possible to cause the light-shielding film 271 to reduce or prevent the light LL or other external light advancing in the Z1 direction from being incident on the TFT 240. The TFT 240 is also disposed in the Z2 direction with respect to the light-shielding film 272 or 273. This makes it possible to cause the light-shielding film 272 or 273 to reduce or prevent the external light advancing in the Z2 direction from being incident on the TFT 240. Each of the light-shielding films 271, 272, and 273 is composed of a metal, a metal silicide, a metal compound, or the like, for example. The light-shielding film 271, 272, or 273, when having conductivity, may serve as the scanning lines 241, the signal lines 242, and the capacitor lines 243 that are aforementioned, and may also serve as electrodes of the storage capacitor 244.

The lens structural body 280 includes a lens array for adjusting the spread angle of the light LL for each of the pixels P. The lens structural body 280 of the first embodiment is configured to adjust the spread angle of the light LL emitted from the liquid crystal layer 500 to within a desired range for each of the pixels P. The lens structural body 280 illustrated in FIG. 4 includes a light-transmissive layer 281 and a lens layer 282.

The light-transmissive layer 281 is a layered base member having light-transmissivity and insulating properties. The light-transmissive layer 281 is composed of a silicon oxide, a silicon oxynitride, or the like, for example. A plurality of concave faces 283 are provided on a surface on a side of the lens layer 282 of the light-transmissive layer 281. Although not illustrated, the plurality of concave faces 283 are arrayed, in a plan view, in a matrix pattern corresponding to the plurality of pixels P. Each of the plurality of concave faces 283 includes a curved face that functions as a lens face. The light-transmissive layer 281 of the first embodiment includes a plurality of layers that differ in etching rate from one another in an etching used for forming the concave face 283. Note that a layered structure of the light-transmissive layer 281 will be described later in detail.

The lens layer 282 is disposed on the light-transmissive layer 281 to fill insides of the plurality of concave faces 283. The lens layer 282 is a layer having light-transmissivity and insulating properties composed of a material having a refractive index different from the refractive index of the light-transmissive layer 281. It is preferred that the refractive index of the lens layer 282 be greater than the refractive index of the light-transmissive layer 281. Examples of a constituent material of the lens layer 282 include silicon oxynitride and silicon nitride, for example. A plurality of convex faces 284 are provided on a surface on a side of the light-transmissive layer 281 of the lens layer 282. Each of the plurality of convex faces 284 has a complementary shape to the concave face 283 of the light-transmissive layer 281 aforementioned, and includes a curved face that functions as a lens face together with the concave face 283.

The protective film 290 is a film having light-transmissivity and insulating properties, which is disposed on a surface on a side opposite from the light-transmissive layer 281 of the lens layer 282. The protective film 290 is constituted by a silicon nitride film, a silicon oxide film, or the like, for example. The protective film 290, which is disposed on the lens layer 282, makes it possible to reduce the occurrence of cracks or the like in the lens layer 282 during a manufacture of the element substrate 200, and to enhance a flatness of the pixel electrode 220 compared to when not using the protective film 290. Note that the protective film 290 may be composed of a glass such as, for example, a borosilicate glass (BSG) from a perspective of enhancing adhesion to the pixel electrode 220.

The plurality of pixel electrodes 220 are arranged on a surface on a side opposite from the lens structural body 280 of the protective film 290. The plurality of pixel electrodes 220 are arrayed, in a plan view, in a matrix pattern corresponding to the pixel P. Although not illustrated, each of the plurality of pixel electrodes 220 is electrically coupled to the drain of the TFT 240 via a through electrode passing through the lens structural body 280 and the protective film 290 that are aforementioned. The first alignment film 230 is disposed on a surface on a side opposite from the protective film 290 of the plurality of pixel electrodes 220. Note that it suffices that the protective film 290 be provided as necessary, and the protective film 290 may be omitted. In this case, the plurality of pixel electrodes 220 are directly arranged on the lens structural body 280.

1A-4. Layered Structure of Light-Transmissive Layer 281

Figure 5:
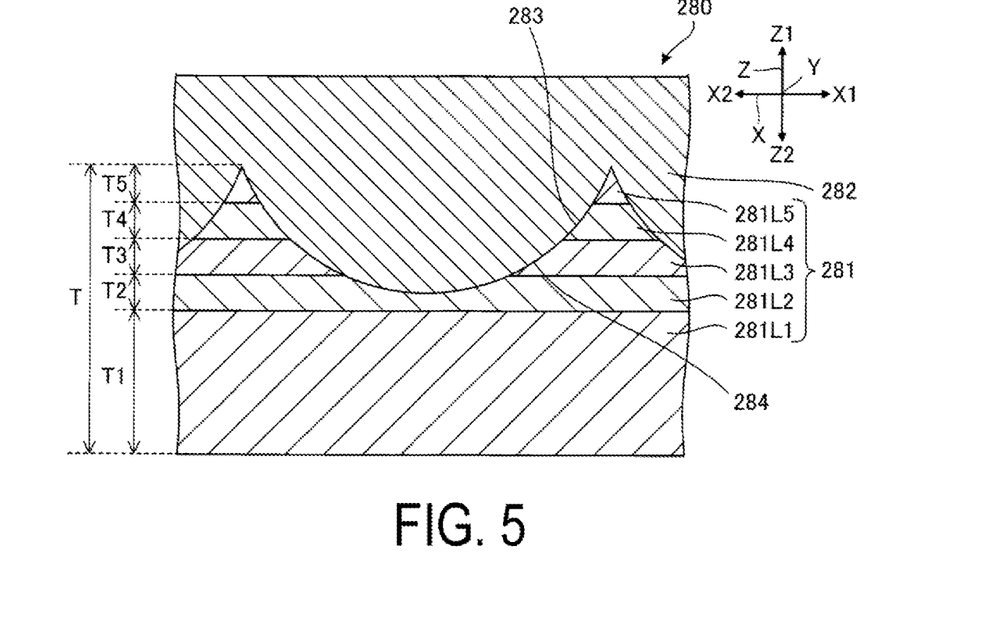
FIG. 5 is an enlarged cross-sectional view of a part of a lens structural body of an element substrate.

FIG. 5 is an enlarged cross-sectional view of a part of the lens structural body 280 of the element substrate 200. FIG. 5 illustrates a case in which the light-transmissive layer 281 has a layered structure of five layers. As illustrated in FIG. 5, the light-transmissive layer 281 includes layers 281L1, 281L2, 281L3, 281L4, and 281L5, which are layered in this order. Here, the concave face 283 is provided across a plurality of the layers 281L2, 281L3, 281L4, and 281L5 among these layers excluding the layer 281L1.

The layers 281L1, 281L2, 281L3, 281L4, and 281L5 differ in etching rate from one another in the etching used for forming the concave face 283. Accordingly, setting as appropriate the etching rates of the layers 281L1, 281L2, 281L3, 281L4, and 281L5 makes it possible to easily form, by etching, the concave face 283 having a desired lens face shape.

Figure 6:
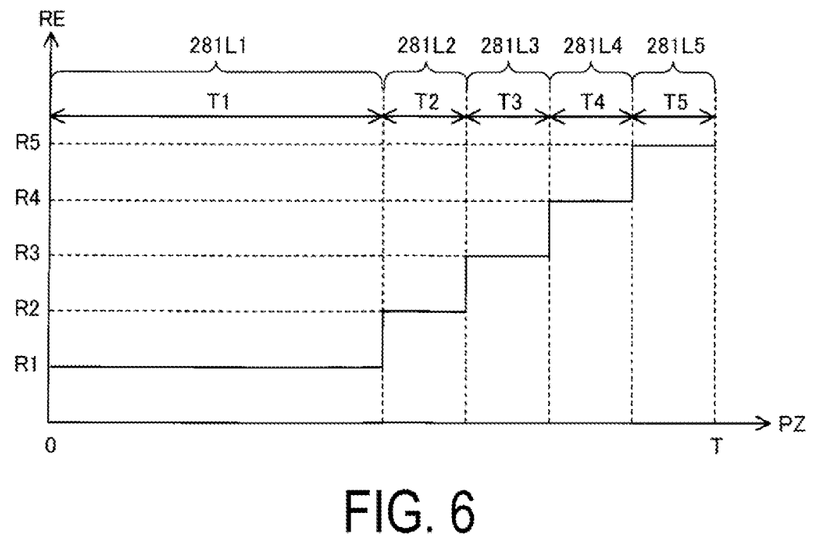
FIG. 6 is a graph illustrating a relationship between a position in a thickness direction and an etching rate in a base member on which a concave face is provided.

FIG. 6 is a graph illustrating the relationship between a position PZ and an etching rate RE in a thickness direction of the light-transmissive layer 281 being a base member on which the concave face 283 is provided. In FIG. 6, a relationship of R1<R2<R3<R4<R5 is satisfied by an etching rate R1 of the layer 281L1, an etching rate R2 of the layer 281L2, an etching rate R3 of the layer 281L3, an etching rate R4 of the layer 281L4, and an etching rate R5 of the layer 281L5. However, a relative ratio of the etching rates R1, R2, R3, R4, and R5 is set as appropriate in accordance with a shape of the concave face 283 that is desired, without being limited to the ratio illustrated in FIG. 6. Note that the etching rate R1 may be optional without satisfying the aforementioned relationship due to a location of the layer 281L1 at an outside of a formation region of the concave face 283. In addition, although the etching rate of an identical layer is constant in the thickness direction, the etching rate of an identical layer may vary in the thickness direction. For example, the etching rate may vary stepwise or continuously in the thickness direction at an identical layer such that a difference in the etching rate between the respective adjacent layers is minimized.

It suffices that constituent materials of the layers 281L1, 281L2, 281L3, 281L4, and 281L5 have the etching rates under an identical etching condition for these layers different from one another, and the constituent materials may be mutually composed of different compositions, however, it is preferred that the constituent materials be mutually composed of an identical composition. When the layers 281L1, 281L2, 281L3, 281L4, and 281L5 are mutually composed of an identical composition, an identical film forming apparatus can be used to continuously form the layers 281L1, 281L2, 281L3, 281L4, and 281L5. Also, in this case as well, the etching rates under an identical etching condition of these layers can be differed by making composition ratios of the constituent materials of the layers 281L1, 281L2, 281L3, 281L4, and 281L5 different.

More specifically, each of a plurality of the layers 281L1, 281L2, 281L3, 281L4, and 281L5 may include a silicon oxide film or a silicon oxynitride film. Note that when each of these layers includes a silicon oxide film or a silicon oxynitride film, the aforementioned etching rate is an etching rate by using a dilute hydrofluoric acid, for example.

The silicon oxide film or the silicon oxynitride film can be efficiently formed by a film forming method such as thermal oxidation or plasma CVD. The silicon oxide film or the silicon oxynitride film can also be differed in etching rate from each other by making a content ratio of oxygen element different. Specifically, the etching rate by using a dilute hydrofluoric acid of the silicon oxide film or the silicon oxynitride film can be decreased by increasing the content ratio of oxygen element of the silicon oxide film or the silicon oxynitride film, while the etching rate can be increased by reducing the content ratio of oxygen element. Thus, when each of the plurality of the layers 281L1, 281L2, 281L3, 281L4, and 281L5 includes a silicon oxide film or a silicon oxynitride film, the light-transmissive layer 281 including the plurality of the layers 281L1, 281L2, 281L3, 281L4, and 281L5 that differ in etching rate from one another can be easily formed compared to when using a film composed of another constituent material. Moreover, when a silicon nitride is used as the constituent material of the lens layer 282, a difference in refractive index between the lens layer 282 and the light-transmissive layer 281 can be set to a degree suitable for lens characteristics.

Thus, when each of the plurality of the layers 281L1, 281L2, 281L3, 281L4, and 281L5 includes a silicon oxide film or a silicon oxynitride film, the content ratios of oxygen elements of these layers may differ from one another. In this case, the light-transmissive layer 281 including the plurality of the layers 281L1, 281L2, 281L3, 281L4, and 281L5 that differ in etching rate from one another can be easily formed.

The plurality of the layers 281L1, 281L2, 281L3, 281L4, and 281L5 may also differ in density from one another. In this case, even when compositions and composition ratios of materials constituting these layers are identical to one another, the etching rates of these layers can be differed from one another. Specifically, the etching rate by using a dilute hydrofluoric acid of the silicon oxide film or the silicon oxynitride film can be decreased by increasing a density of the silicon oxide film or the silicon oxynitride film, while the etching rate can be increased by reducing the density.

In FIG. 5, a relationship of T1>T2=T3=T4=T5 is satisfied by a thickness T1 of the layer 281L1, a thickness T2 of the layer 281L2, a thickness T3 of the layer 281L3, a thickness T4 of the layer 281L4, and a thickness T5 of the layer 281L5. However, the thicknesses T2, T3, T4, and T5 may be set as appropriate in accordance with the shape of the concave face 283 that is desired, and may differ from one another. By making the thicknesses T2, T3, T4, and T5 different form one another, the shape of the concave face 283 can be adjusted in conjunction with the aforementioned difference in the etching rates. Note that the thickness T1 may be optional without satisfying the aforementioned relationship due to the location of the layer 281L1 at the outside of the formation region of the concave face 283.

1A-5. Method for Manufacturing Electro-Optical Device 100

Figure 7:
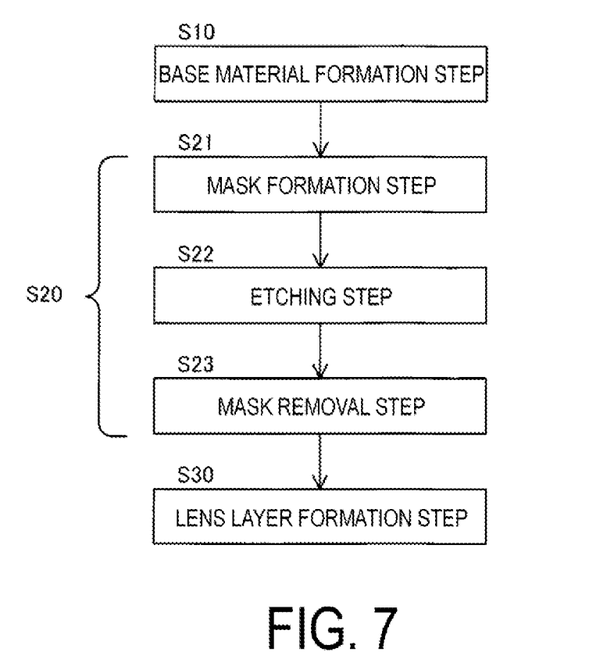
FIG. 7 is a perspective view illustrating a flow of a method for manufacturing an electro-optical device according to a first embodiment.

FIG. 7 is a perspective view illustrating a flow of the method for manufacturing the electro-optical device 100 according to the first embodiment. In FIG. 7, a manufacturing process for the lens structural body 280 is illustrated as a representative among manufacturing processes for the electro-optical device 100. Note that a structure other than the lens structural body 280 in the electro-optical device 100 can be manufactured by a known method.

As illustrated in FIG. 7, the method for manufacturing the electro-optical device 100 includes a base member formation step S10, a concave face formation step S20, and a lens layer formation step S30. The concave face formation step S20 of the first embodiment includes a mask formation step S21, an etching step S22, and a mask removal step S23. Each of the steps will be orderly described below.

Figure 8:
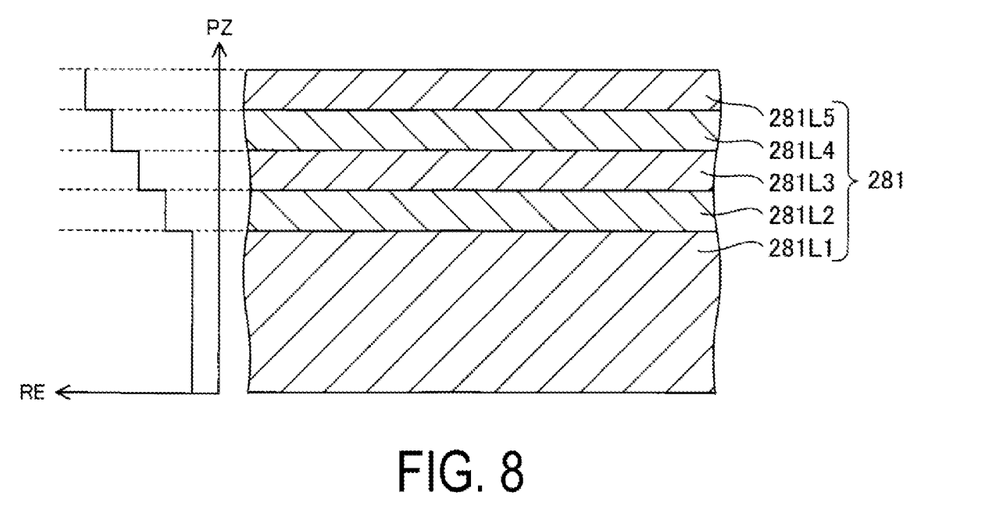
FIG. 8 is an explanatory cross-sectional view illustrating a base member formation step of a first embodiment.

FIG. 8 is an explanatory cross-sectional view illustrating the base member formation step S10 of the first embodiment. As illustrated in FIG. 8, first, a base member 281A is formed. The base member 281A is a layer to be the light-transmissive layer 281. For forming the base member 281A, a vapor deposition method such as a chemical vapor deposition (CVD) method is used, for example. Here, a tetraethoxysilane (TEOS) or an $SiH_4$ is used for a raw material gas, for example. In addition, the light-transmissive layer 281 is subjected, as necessary, to a flattening treatment using a chemical mechanical polishing (CMP) method or the like.

To explain more specifically, the layers 281L1, 281L2, 281L3, 281L4, and 281L5 are formed in this order. At this time, a ratio of the raw material gas to an oxygen is changed stepwise. For example, a film formation condition such as pressure, temperature, or power in a CVD apparatus are differed for each of the layers. This makes it possible to obtain the layers 281L1, 281L2, 281L3, 281L4, and 281L5 in which the content ratios, densities, or the like of oxygen elements differ from one another. For example, a greater pressure allows to increase the content ratios of oxygen elements of the layers, or to reduce the densities of the layers. A higher temperature allows to increase the content ratios of oxygen elements of the layers, or to reduce the densities of the layers. A smaller power in the CVD apparatus allows to increase the content ratios of oxygen elements of the layers, or to reduce the density of the layers. As a result of the above, the layers 281L1, 281L2, 281L3, 281L4, and 281L5, at which the etching rate RE aforementioned is achieved, are obtained.

Figure 9:
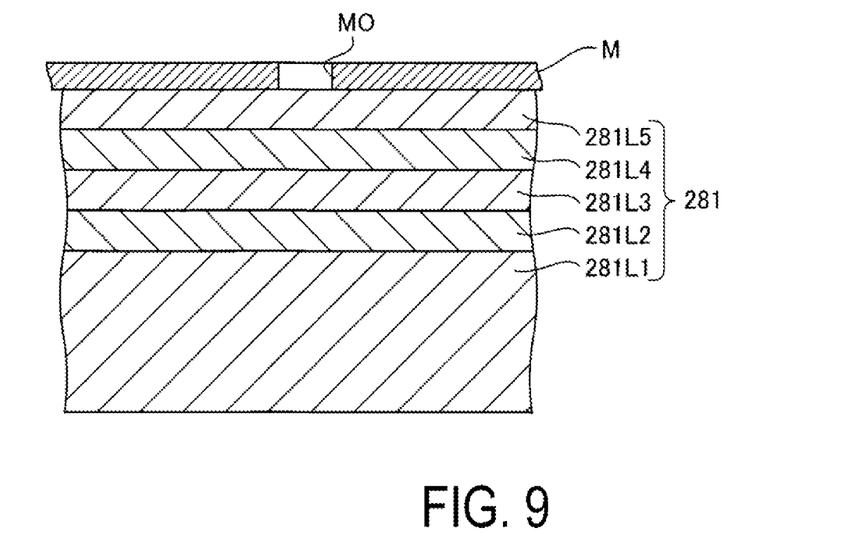
FIG. 9 is an explanatory cross-sectional view illustrating a mask formation step of a first embodiment.

FIG. 9 is an explanatory cross-sectional view illustrating a mask formation step of the first embodiment. After the base member formation step S10 aforementioned, a mask M is formed, as illustrated in FIG. 9. Specifically, a resist material is applied onto the base member 281A and is then exposed and developed to form the mask M. An opening MO is provided in the mask M. Note that a metal film may be used as the mask M.

Figure 10:
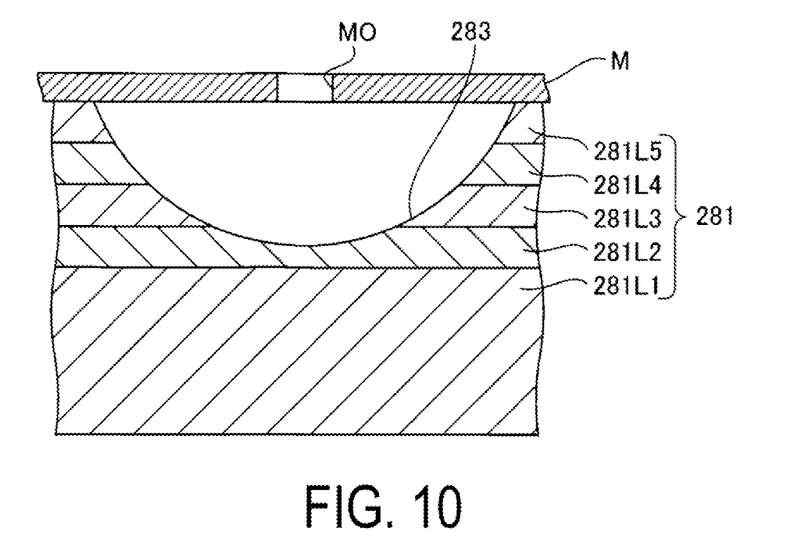
FIG. 10 is an explanatory cross-sectional view illustrating an etching step of a first embodiment.

FIG. 10 is an explanatory cross-sectional view illustrating the etching step S15 of the first embodiment. After the mask formation step S21 aforementioned, the etching step S22 is conducted, as illustrated in FIG. 10. In the etching step S22, the concave face 283 is formed. In the etching step S22, a gas etching using a fluorine-based etching gas, such as a hydrogen fluoride (HF), or a wet etching using a fluorine-based etchant such as a hydrogen fluoride (HF) is used, for example.

Figure 11:
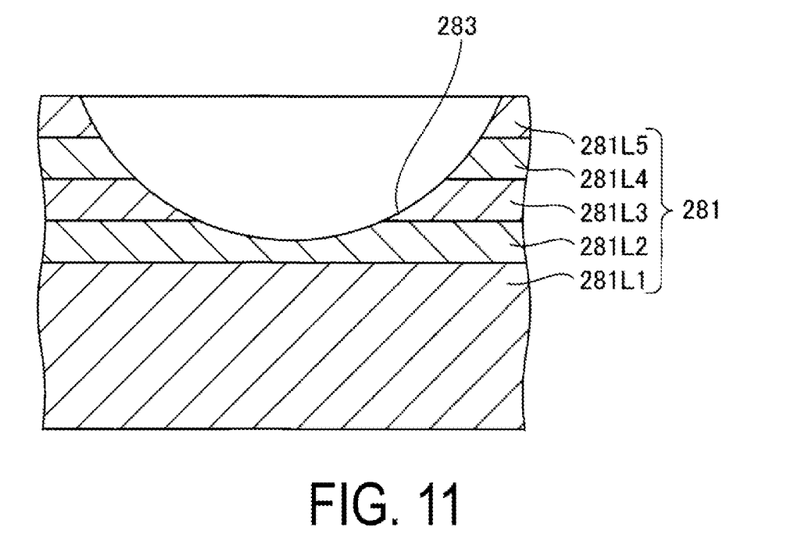
FIG. 11 is an explanatory cross-sectional view illustrating a mask removal step of a first embodiment.

FIG. 11 is an explanatory cross-sectional view illustrating the mask removal step S23 of the first embodiment. After the etching step S22, the mask M is removed, as illustrated in FIG. 11. In the mask removal step S23, an ashing by using a plasma, an ozone, or the like is used, for example.

Figure 12:
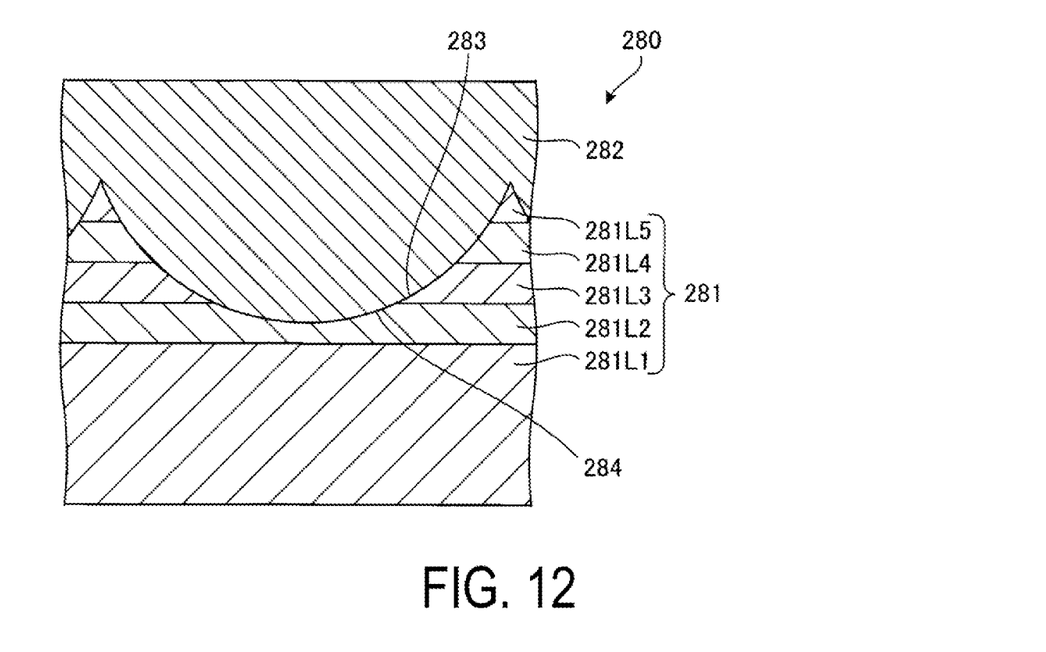
FIG. 12 is an explanatory cross-sectional view illustrating a lens layer formation step of a first embodiment.

FIG. 12 is an explanatory cross-sectional view illustrating the lens layer formation step S13 of the first embodiment. After the mask removal step S23, the lens layer 282 is formed, as illustrated in FIG. 12. In the lens layer formation step S30, a vapor deposition method such as a CVD method is used, for example. In addition, the lens layer 282 is subjected, as necessary, to a flattening treatment using a chemical mechanical polishing (CMP) method or the like. As a result of the above, the lens structural body 280 is obtained.

As described above, the method for manufacturing the electro-optical device 100 includes the base member formation step S10, the concave face formation step S20, and the lens layer formation step S30. In the base member formation step S10, the plurality of the layers 281L1, 281L2, 281L3, 281L4, and 281L5 of which etching rates under an identical etching condition differ from one another are layered to form the base member 281A having light-transmissivity including these layers. In the concave face formation step S20, the base member 281A is etched to form the concave face 283. The concave face formation step S20 allows to obtain the light-transmissive layer 281 on which the concave face 283 is provided. In the lens layer formation step S30, the lens layer 282 having a refractive index different from the refractive index of the base member 281A is formed to fill the inside of the concave face 283.

The method for manufacturing the electro-optical device 100 described above makes it possible, by setting as appropriate the etching rates of the layers 281L1, 281L2, 281L3, 281L4, and 281L5, to easily form, by etching, the concave face 283 having a desired lens face shape.

1B. Second Embodiment

Next, the second embodiment will be described. The second embodiment is the same as the first embodiment aforementioned except that the layers constituting a base member 281B differ in etching rate from one another. Note that, in the following description, the second embodiment will be described focusing on differences from the first embodiment aforementioned, and descriptions of similar matters will be omitted.

Figure 13:
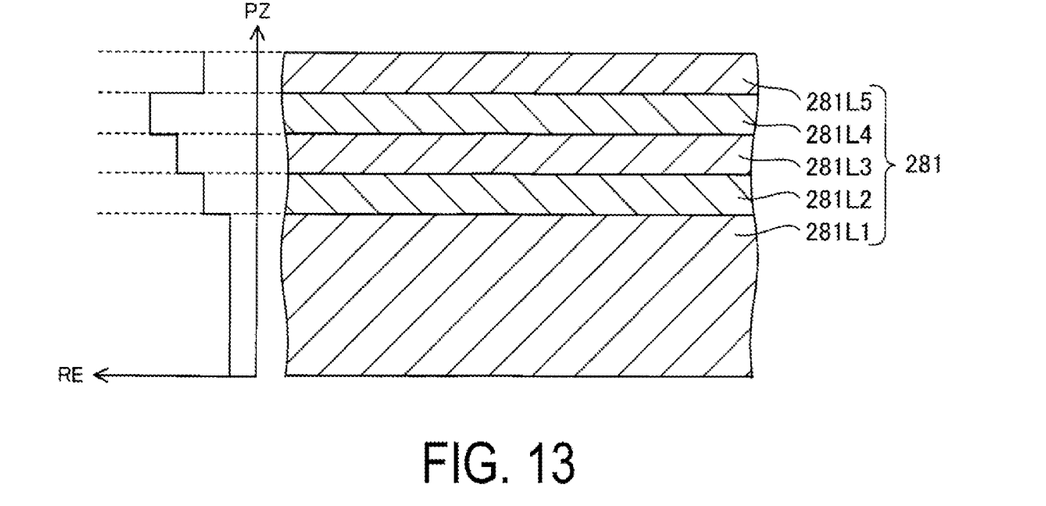
FIG. 13 is an explanatory cross-sectional view illustrating a base member of a second embodiment.

FIG. 13 is an explanatory cross-sectional view illustrating the base member 281B of the second embodiment. In the base member 281B illustrated in FIG. 13, the etching rate of the layer 281L5 is less than the etching rate of the layer 281L4. Accordingly, a formation of the concave face 283 by etching the base member 281B facilitates the shape of the concave face 283 approximating a spherical surface. In addition, with the second embodiment as well, the same advantageous effects as those of the first embodiment aforementioned can be achieved. Note that in FIG. 13, the etching rate of the layer 281L5 is equal to the etching rate of the layer 281L3, however, the etching rate of the layer 281L5 may be greater or less than the etching rate of the layer 281L3 without being limited to this.

1C. Third Embodiment:

Next, the third embodiment will be described. The third embodiment is the same as the first embodiment aforementioned except that the layers constituting a base member 281C differ from one another. Note that, in the following description, the third embodiment will be described focusing on differences from the first embodiment aforementioned, and descriptions of similar matters will be omitted.

Figure 14:
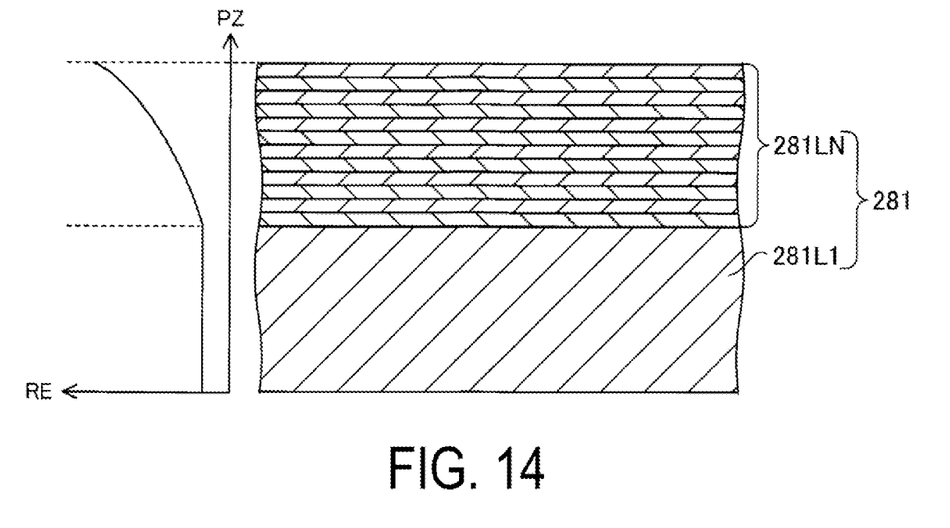
FIG. 14 is an explanatory cross-sectional view illustrating a base member of a third embodiment.

FIG. 14 is an explanatory cross-sectional view illustrating the base member 281C of the third embodiment. The base member 281C illustrated in FIG. 14 includes the layer 281L1 and a layered body LN, which are layered. FIG. 14 illustrates a case in which the number of stacked layers in the layered body LN is 12. In the layered body LN, the etching rate increases as being located away from the layer 281L1. As described above, increasing the number of the layers constituting the base member 281C substantially makes it possible to continuously vary the etching rate in a thickness direction of the base member 281C. In addition, with the third embodiment as well, the same advantageous effects as those of the first embodiment aforementioned can be achieved. Note that the number of stacked layers in the layered body LN may be 11 or less or 13 or more without being limited to 12. Also, a magnitude relationship of the etching rates of the layers constituting the layered body LN is optional without being limited to the relationship illustrated in FIG. 14.

2. Electronic Apparatus

The electro-optical device 100 can be used for various electronic apparatuses.

Figure 15:
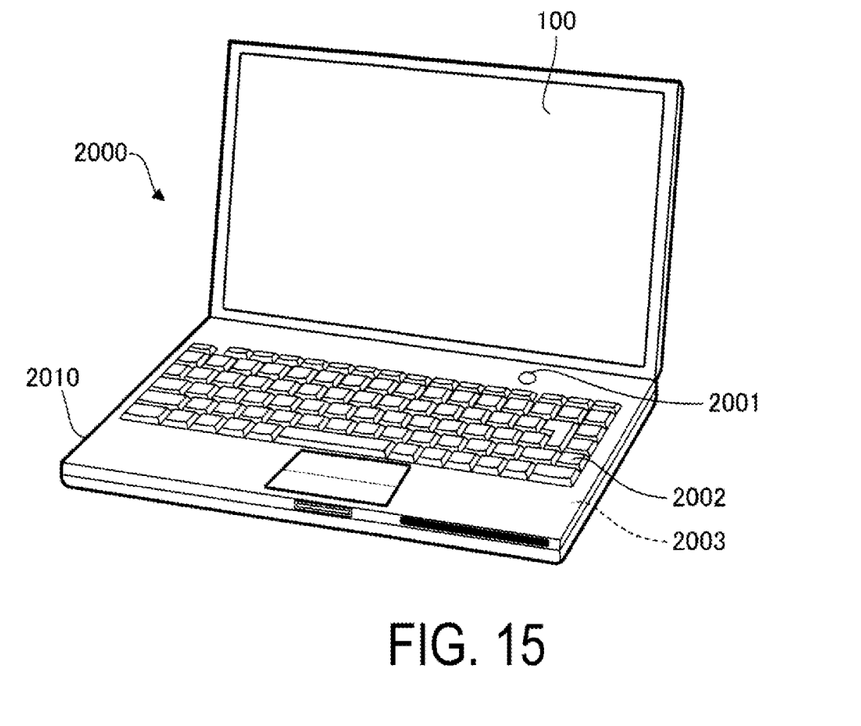
FIG. 15 is a perspective view illustrating a personal computer as an example of an electronic apparatus.

FIG. 15 is a perspective view illustrating a personal computer 2000 as an example of an electronic apparatus. The personal computer 2000 includes the electro-optical device 100 configured to display various types of images, a main body portion 2010 in which a power source switch 2001 and a keyboard 2002 are installed, and a control unit 2003. The control unit 2003 includes, for example, a processor and a memory to control an operation of the electro-optical device 100.

Figure 16:
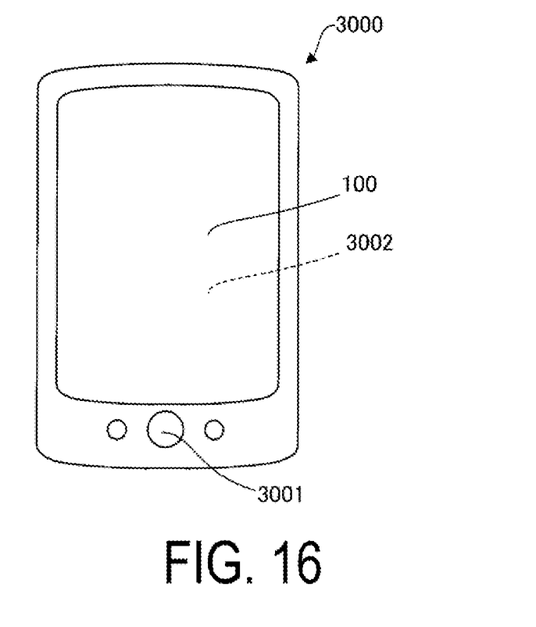
FIG. 16 is a perspective view illustrating a smartphone as an example of an electronic apparatus.

FIG. 16 is a perspective view illustrating a smartphone 3000 as an example of an electronic apparatus. The smartphone 3000 includes an operation button 3001, the electro-optical device 100 configured to display various types of images, and a control unit 3002. A screen content displayed on the electro-optical device 100 is changed in accordance with an operation of the operation button 3001. The control unit 3002 includes, for example, a processor and a memory to control the operation of the electro-optical device 100.

Figure 17:
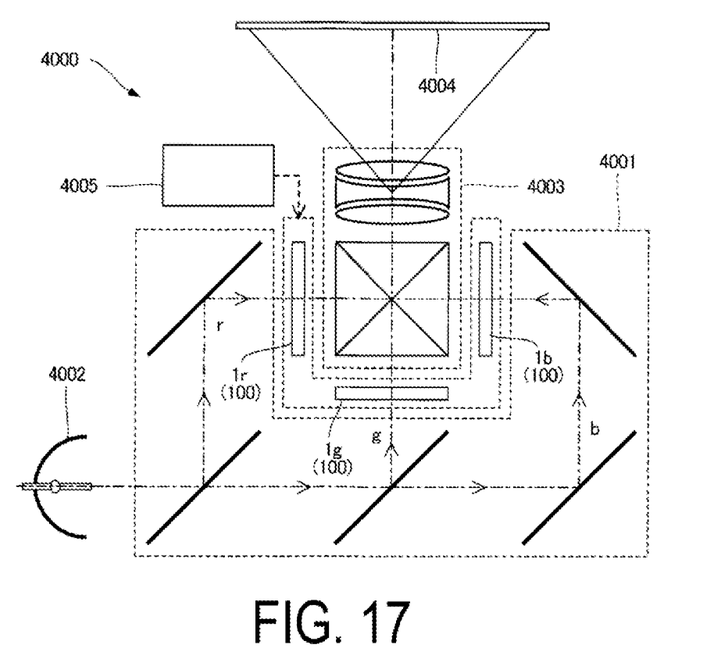
FIG. 17 is a view schematically illustrating a projector as an example of an electronic apparatus.

FIG. 17 is a view schematically illustrating a projector as an example of an electronic apparatus. A projection-type display apparatus 4000 is a three-plate type projector, for example. An electro-optical device 1r is the electro-optical device 100 corresponding to a red display color, an electro-optical device 1g is the electro-optical device 100 corresponding to a green display color, and an electro-optical device 1b is the electro-optical device 100 corresponding to a blue display color. That is, the projection-type display apparatus 4000 includes three pieces of the electro-optical devices 1r, 1g, and 1b that correspond to display colors of red, green, and blue, respectively. The control unit 4005 includes, for example, a processor and a memory to control the operation of the electro-optical device 100.

An illumination optical system 4001 supplies a red component r of light emitted from an illumination device 4002 as a light source to the electro-optical device 1r, a green component g of the light to the electro-optical device 1g, and a blue component b of the light to the electro-optical device 1b. Each of the electro-optical devices 1r, 1g, and 1b functions as an optical modulator such as a light valve configured to modulate the respective monochromatic light that is supplied from the illumination optical system 4001 depending on display images. A projection optical system 4003 synthesizes the light emitted from each of the electro-optical devices 1r, 1g, and 1b to project the synthesized light onto a projection surface 4004.

The electronic apparatus described above includes the electro-optical device 100 and the control units 2003, 3002, or 4005, which are aforementioned. This makes it possible to enhance a display quality of the personal computer 2000, the smartphone 3000, or the projection-type display apparatus 4000.

Note that electronic apparatuses to which the electro-optical device according to the present disclosure is applied include, in addition to the apparatuses as exemplified, personal digital assistants (PDA), digital still cameras, televisions, video cameras, car navigation devices, display devices for in-vehicle use, electronic organizers, electronic papers, electronic calculators, word processors, workstations, visual telephones, and point of sale (POS) terminals, for example. Electronic apparatuses to which the present disclosure is applied further include a printer, a scanner, a copier, a video player, and an apparatus including a touch panel.

3. Modification Example

The present disclosure has been described as above based on the preferred embodiments, however, the present disclosure is not limited to the aforementioned embodiments. In addition, the configuration of each of the sections of the present disclosure may be replaced with any configuration that exerts functions equivalent to those of the aforementioned embodiments, and to which any configuration may be added.

In the aforementioned embodiments, the configuration and the method for manufacturing the lens structural body 280 has been mainly described, however, the first base body 210 or the lens structural body 250 can be configured and manufactured in the same manner as the lens structural body 280. A structural body as in the lens structural body 280 may also be provided in the counter substrate 300.

In addition, a direction in which the light LL is incident on the electro-optical device 100 may be a direction opposite to the direction in the aforementioned embodiments.

Also, in the aforementioned description, the liquid crystal display device is described as an example of the electro-optical device of the present disclosure, however, the electro-optical device of the present disclosure is not limited to this. For example, the electro-optical device of the present disclosure can also be applied to an image sensor or the like. In addition, for example, the present disclosure can also be applied, as in the aforementioned embodiments, to a display panel using light-emitting elements such as an organic electroluminescence (EL) device, an inorganic EL device, and a light-emitting polymer. Further, the present disclosure can also be applied, as in the aforementioned embodiments, to an electrophoresis display panel that uses micro capsules each including a colored liquid and white particles dispersed in the liquid.

Also, in the aforementioned description, the TFT is given as an example of a switching element, however, the switching element may be, for example, a metal-oxide-semiconductor field-effect transistor (MOSFET) or the like without being limited to this.

In addition, in the aforementioned embodiments, the electro-optical device 100 of an active matrix driving scheme is exemplified, however, a driving scheme of the electro-optical device may be a passive matrix driving scheme or the like, for example.

What is claimed is:

1. An electro-optical device, comprising:
   a first substrate in which a pixel electrode is provided;
   a second substrate in which a common electrode is provided; and
   an electro-optical layer disposed between the pixel electrode and the common electrode, and having optical characteristics varying in accordance with an electric field, wherein
   the first substrate or the second substrate includes
   a base member including a plurality of layers of which etching rates under a same etching condition differ from one another, the base member having light-transmissivity and provided with a concave portion corresponding to the pixel electrode, the concave portion passing through a part of the plurality of layers, and
   a lens layer disposed to fill inner sides of the concave portion and having a refractive index different from that of the base member, wherein the electro-optical device further comprises:

a transistor corresponding to the pixel electrode, wherein the base member is disposed in a layer between the transistor and the pixel electrode, a layer closest to the transistor among the plurality of layers is thicker than other layers.

2. The electro-optical device according to claim 1, wherein each of the plurality of layers is a silicon oxide film or a silicon oxynitride film.

3. The electro-optical device according to claim 2, wherein content ratios of oxygen elements of the plurality of layers differ from one another.

4. The electro-optical device according to claim 2, wherein densities of the plurality of layers differ from one another.

5. An electronic apparatus, comprising:

the electro-optical device according to claim 1; and a control unit configured to control an operation of the electro-optical device.

6. A method for manufacturing an electro-optical device, the method comprising:

laminating a plurality of layers of which etching rates under a same etching condition differ from one another, thereby forming a base member having light-transmissivity;

etching the base member, thereby forming a concave portion, wherein the concave portion passes through a part of the plurality of layers; and forming a lens layer having a refractive index different from that of the base member, thereby filling an inner side of the concave portion, wherein the electro-optical device comprises:

a transistor corresponding to a pixel electrode, wherein the base member is disposed in a layer between the transistor and the pixel electrode, a layer closest to the transistor among the plurality of layers is thicker than other layers.

7. The method for manufacturing an electro-optical device according to claim 6, wherein each of the plurality of layers is a silicon oxide film or a silicon oxynitride film.

8. The method for manufacturing an electro-optical device according to claim 7, wherein content ratios of oxygen elements of the plurality of layers differ from one another.

9. The method for manufacturing an electro-optical device according to claim 7, wherein densities of the plurality of layers differ from one another.

* * * * *